May 16, 1933. F. J. WATTS 1,909,642
ELECTRIC SWITCH AND CASING
Filed Aug. 8, 1930
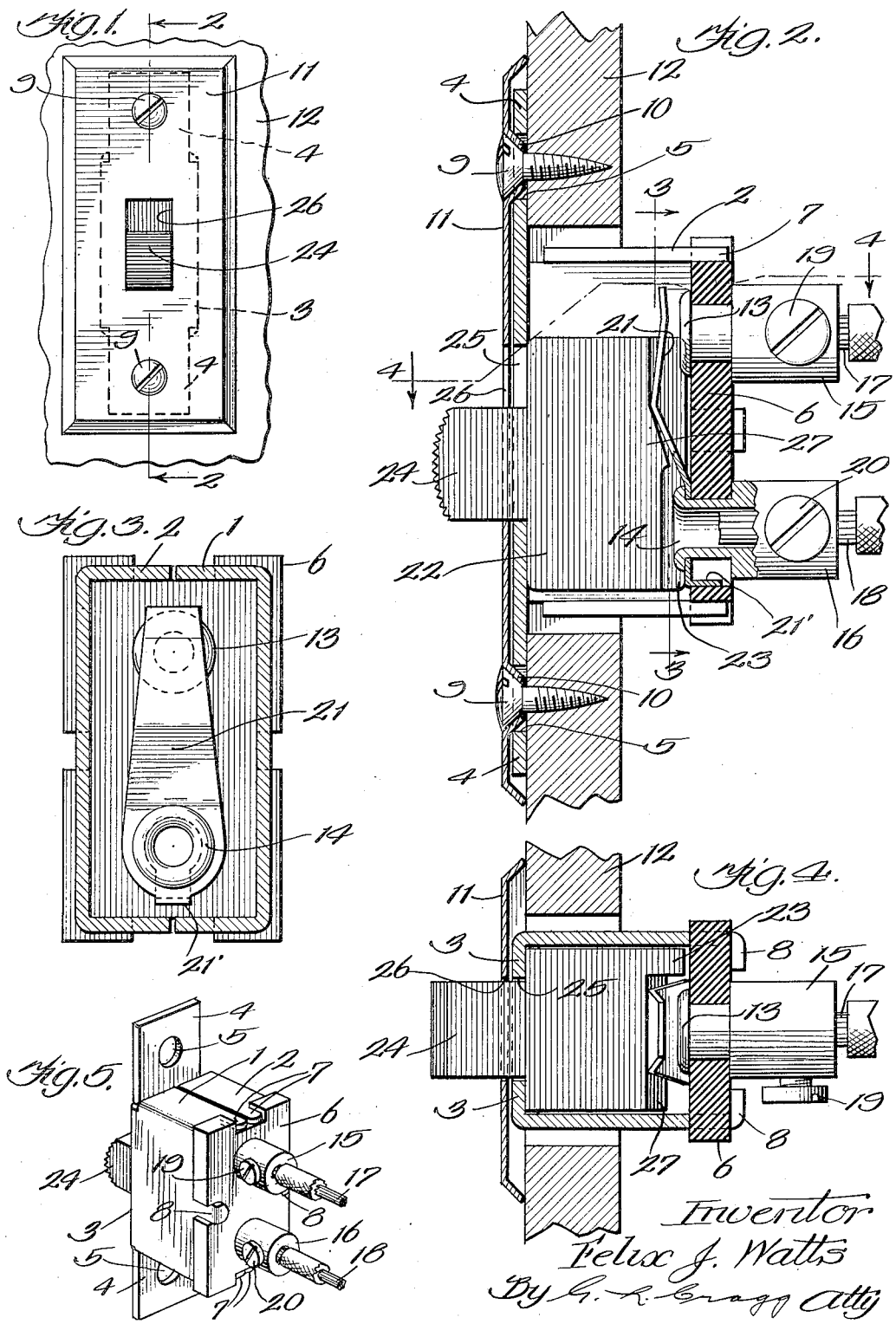
Inventor
Felix J. Watts
By G. R. Gragg Atty Patented May 16, 1933

1,909,642

UNITED STATES PATENT OFFICE

FELIX J. WATTS, OF BRONSON, MICHIGAN, ASSIGNOR TO HARRY A. DOUGLAS, OF BRONSON, MICHIGAN

ELECTRIC SWITCH AND CASING

Application filed August 8, 1930. Serial No. 473,822.

My invention relates to electric switches and housings therefor and has for its general object the provision of means whereby a contact actuator may be movable within the casing with no other guiding means than that afforded by the casing walls. This contact actuator is desirably reciprocable on which account it is formed with a recess which receives the movable contact of the switch and a flange margining said recess and engaging a contiguous wall of the casing to prevent canting of the actuator.

The invention will be more fully explained in connection with the accompanying drawing in which Fig. 1 is a front elevation of the preferred embodiment of the invention; Fig. 2 is a sectional view on line 2—2 of Fig. 1, on a larger scale; Fig. 3 is a sectional view on line 3—3 of Fig. 2; Fig. 4 is a sectional view on line 4—4 of Fig. 2; and Fig. 5 is a perspective view.

The casing illustrated is formed in two symmetrically related U-shaped sections 1 and 2. One of the casing walls 3 is a bent continuation of at least one of these sections and preferably of both. When the wall 3 is integrally made with both casing sections these three parts of the casing may be formed out of a single stamping that is finally brought to the shape illustrated. Said wall 3 desirably has continuations 4 extending beyond the casing and provided for attachment to a support. These continuations may be provided with apertures 5 for the passage of mounting screws. The remaining wall 6 of the casing is preferably made of insulation, but also supplements the wall 3 in the function of maintaining the two casing sections 1 and 2 in their proper relation. The wall 6 and the contiguous portions of the two casing sections have interengaging formations enabling this wall to take part in performing this function. The interengaging formations illustrated are in the nature of tongues 7 that project from the meeting edges of the casing sections, tongues 8 projecting from the base portions of the casing sections and notches in the wall 6 that snugly receive said tongues. The wall 6 rests against the contiguous edges of the casing sections 1 and 2 and is held in such engagement by the clinching of the tongues 8. The tongues 7 need not be clinched, these tongues being provided to be engaged by the sides of the notches in the wall 6 that receive them to limit the spreading action of the two casing sections and thereby hold them in predetermined spaced apart relation. The mounting screws 9 illustrated have tapering heads and preferably have clamping engagement with the wall continuations 4 through the intermediation of conical sockets 10 which are formed upon an escutcheon or finishing plate 11 that covers this wall, these conical sockets being received in said openings and engaging the margins thereof to hold the wall continuations 4 against the selected support 12. The closure wall 6 of the casing is desirably made of insulation when it is to serve as a carrier for contacts of the switch. One of these contacts 13 and a part 14 of the other contact structure are illustrated as being in the nature of flanges upon the reduced ends of metallic sleeves 15 and 16 respectively, the wall 6 being gripped between these flanges and the larger portions of said sleeves as a result of the riveting operation that forms the flanges. Terminal portions of circuit wires 17 and 18 pass into the bores of said sleeves and are held in mechanical and electrical assembly therewith by means of binding screws 19 and 20. The contact to which the flange 14 pertains is desirably provided upon a leaf spring 21 having one end apertured and receiving the reduced end of the corresponding sleeve 16, this apertured end of the leaf spring being clamped between the flange 14 and the wall 6. The leaf spring is provided with an angular tail 21′ which enters a recess in the wall 6 to prevent this spring from turning upon the sleeve 16. Said leaf spring is so tensioned that its unmounted end, which constitutes a contact complemental to the contact 13 is spaced apart from this contact into circuit opening position unless the spring is pressed, against the force of its own resilience, into engagement with this contact.

The contact actuator illustrated is in the form of a block 22 of insulation and having a size and shape to be engageable with all of the four walls of the casing that extend along the line of movement of the wall so that no supplemental guiding formations need be provided. The block is recessed to accommodate the leaf spring 21, such block having a flange 23 which engages the closure wall 6, this flange serving to prevent material twisting or canting of the actuator across its direction of movement. Said actuator is provided with a handle 24 which projects through the register openings 25 and 26 that are formed in the casing wall 3 and escutcheon plate 7, these openings being elongated in the direction of movement of the actuator to permit this actuator to be placed in its alternative positions. The leaf contact spring 21 cooperates with a detent 27 that is formed upon the actuator to hold this actuator in its alternative positions in one of which the switch is opened and in the other of which the switch is closed.

Changes may be made without departing from the invention.

Having thus described my invention I claim:

In an electric switch, the combination with a rectangular casing; one of the walls of the casing being of insulated material; of fixed contacts carried in spaced apart relation by said insulating wall; a leaf spring anchored to one of the contacts and normally spaced from the other contact which is complemental thereto; an actuator of insulating material reciprocable in the casing and guided by the walls thereof, said actuator having a recess therein receiving the leaf spring, said leaf spring having a hump thereon riding one of the walls of the recess; another hump in said wall of the recess cooperating with the hump on the spring to press the spring upon the complemental contact in one position of the actuator; and a detent formation on the hump of the actuator cooperating with the spring to hold the actuator in its alternative positions, in one of which the switch is open and in the other of which the switch is closed.

In witness whereof, I hereunto subscribe my name.

FELIX J. WATTS.